United States Patent [19]

Kumar et al.

[11] 4,264,556

[45] Apr. 28, 1981

[54] THERMAL ISOSTATIC DENSIFYING METHOD AND APPARATUS

[76] Inventors: Kaplesh Kumar, 25 Redwing Rd., Wellesley, Mass. 02181; Dilip K. Das, 333 Springs Rd., Bedford, Mass. 01730

[21] Appl. No.: 70,147

[22] Filed: Aug. 27, 1979

[51] Int. Cl.³ .......................... B22F 3/02; B30B 5/02; B30B 11/00
[52] U.S. Cl. .............................. 264/314; 425/405 H; 425/78
[58] Field of Search .............. 425/405 H, 78; 264/314

[56] References Cited

U.S. PATENT DOCUMENTS

| 3,249,964 | 5/1966 | Shaler | 425/405 H X |
|---|---|---|---|
| 3,363,037 | 1/1968 | Levey, Jr. et al. | 425/405 H X |
| 3,599,281 | 8/1971 | Boyer | 425/405 H X |
| 3,832,100 | 8/1974 | Baxendale | 425/405 H X |
| 3,931,382 | 1/1976 | Witkin | 425/405 H X |
| 3,973,886 | 8/1976 | Erum | 425/405 H X |
| 4,046,499 | 9/1977 | Saito | 425/405 H |
| 4,056,347 | 11/1977 | Trolle | 425/405 H |

Primary Examiner—J. Howard Flint, Jr.
Attorney, Agent, or Firm—Joseph S. Iandiorio

[57] ABSTRACT

A method and apparatus for thermally isostatically densifying a sample, including placing the sample to be densified into a pressure vessel filled with a thermally expansive pressurizing medium with the medium intermediate the vessel and sample; and varying the thermal energy of the medium to cause it to expand and exert increased pressure to densify the sample.

13 Claims, 10 Drawing Figures

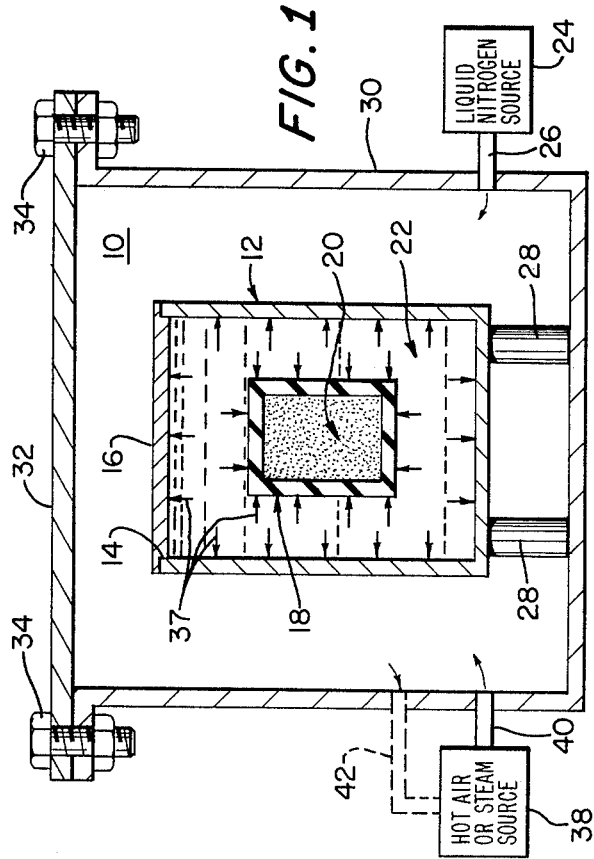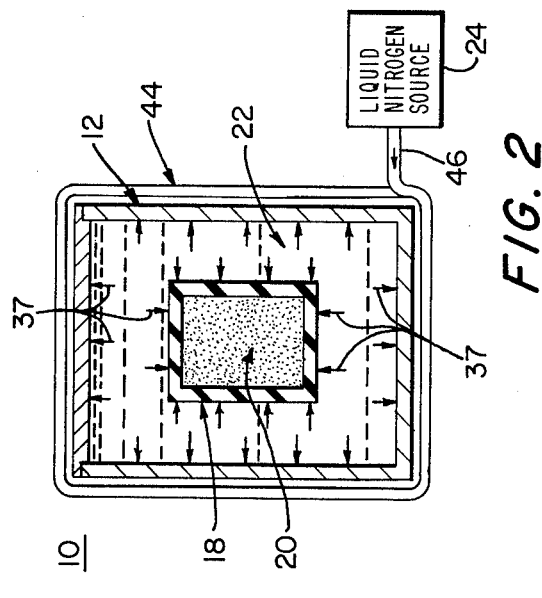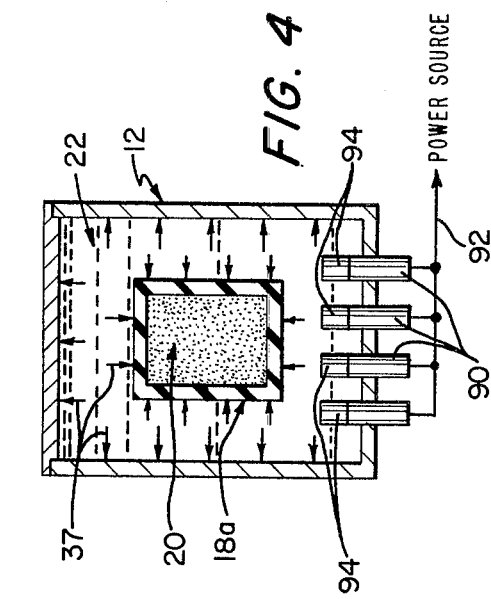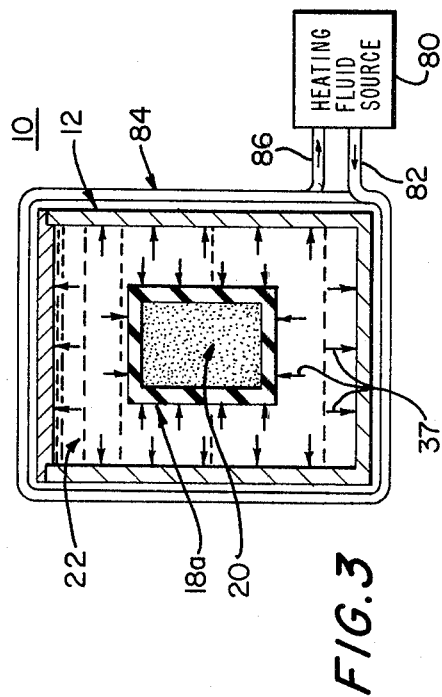

THERMAL ISOSTATIC DENSIFYING METHOD AND APPARATUS

FIELD OF INVENTION

This invention relates to a method of thermally isostatically densifying samples and a thermally powered isostatic press apparatus for effecting same.

BACKGROUND OF INVENTION

Generally, isostatic refers to a technique using a fluid, either a gas or a liquid, to apply equal pressure in all directions to a sample, usually carried in a container. Sometimes isostatic is specific to gas and hydrostatic to liquid; however, herein isostatic refers to both gas and liquid, i.e. fluid materials. Isostatic pressing may be accomplished at elevated temperatures, hot isostatic pressing, or lower temperatures, cold isostatic pressing. In cold isostatic pressing the container is made of a flexible material such as rubber; in hot isostatic pressing the container is made of a deformable material such as metal, plastic or glass, which deforms at the elevated temperature. Cold isostatic pressing techniques are used in pressing samples, such as metal powder or powder compacts, into desired forms using very high pressures. The technique is not restricted to metals: it is used for other materials also; e.g. ceramics. The parts so formed are referred to in the industry as "preforms" or "compacts." After pressing, the compacts are sintered to achieve a density of approximately 94%. This technique is generally less expensive than machining or forging for many metals. Typically the pressure are delivered by mechanical presses such as hydromechanical presses whose performance is measured in hundreds of tons or by other presses which generate pressures of 50–60,000 psi. Recently isostatic presses have created much interest.

Cold isostatic techniques use powerful and expensive plumbing systems which may include complex valve and conduit networks, to increase and decrease the pressure on the sample in a pressure vessel. The isostatic medium is usually specially prepared and much energy is consumed in applying the required high pressures. For higher densities, sintering or hot isostatic pressing is used.

Hot isostatic pressing generally increases density but requires even more equipment. In hot isostatic pressing the sample is heated to softening temperature in an oven or other heating device while the container is squeezed by the fluid. The apparatus includes, in addition to a pressure vessel and compressor or pump, a furnace, vacuum pump, controls and ancillary equipment. Compressors that produce greater than 60,000 psi for cold isostatic pressing are difficult to obtain and are expensive. The capital investment required for mechanical and isostatic presses is substantial: in fact, in the case of most companies powdered metal parts are not made in-house; their production is contracted to others who are specially concerned with powder technology. Isostatic pressing is not limited to the forming of parts: it may also be used to "heal" pores and cracks containing castings and sintered bodies.

SUMMARY OF INVENTION

It is an object of this invention to provide an improved, smaller, simple, less expensive, and easy to use thermal technique for isostatic densifying of samples.

It is a further object of this invention to provide such an improved thermal technique in which the applied pressure is thermally generated and can be operated without pressure pumps, compressors and the like.

It is a further object of this invention to provide such an improved thermal technique in which substantially higher pressures can be generated.

It is a further object of this invention to provide such an improved technique in which the amount of thermal energy required is relatively small and can be obtained inexpensively from readily available sources in many applications.

It is a further object of this invention to provide such an improved technique which enables investigation of new areas of isostatic densifying and new areas of powder conversion due to the substantially higher pressures achievable.

The invention results from the realization that an extremely simple isostatic densifying technique which is inexpensive both initially and to operate can be implemented by using the expansive response of a medium to thermal change to generate a pressure on a sample in a pressure vessel either by adding thermal energy to a medium that increases in volume with increase in temperature or removing thermal energy from a medium that increases in volume with a change of state as its temperature decreases.

The invention features a method of thermally isostatically densifying a sample in a pressure vessel. The pressure vessel is filled with a thermally expansive pressurizing medium with the medium intermediate the vessel and the sample. The thermal energy of the medium is varied, either increased or decreased, to cause it to expand and cause increased pressure on the sample and densify the sample. The sample may be first placed in a container before installation in the vessel.

The invention also features a thermally powered isostatic densifying press. The press includes a pressure vessel which holds the sample. It has an opening therein for enabling access to the interior thereof, with closure means for sealing the opening. A thermally expansive pressurizing medium is disposed in the pressure vessel intermediate the vessel and the sample. The volume of the pressurizing medium varies as a function of the applied thermal energy. A heat exchanger device varies the thermal energy of the pressurizing medium to compel it to expand and exert increased pressure on the sample to compress and densify the sample. The press may include a container for holding the sample. The container may be made of elastomeric material or, if the pressurizing medium is caustic or operated at high temperatures, the container may be made of other suitable material, e.g. plastic, glass, metal, or other plastically deformable material. The sample may be a powder or powder compact of metal or ceramic material. The thermally expansive pressurizing medium may increase in volume with increases in thermal energy or it may increase in volume as it changes state, for example from liquid to solid, as is the case with water. The heat exchanger device may be the walls of the pressure vessel or may include a receptacle which receives a heat exchanger fluid in heat transferring contact with the vessel, for example hot air, steam, liquid nitrogen, liquid helium. The heat exchanger device may also include a coil which carries and directs a flow of heat exchanging fluid about the vessel in heat transferring relationship with it. The pressurizing medium may also be directly heated by means of heater elements installed in the pressure vessel.

DISCLOSURE OF PREFERRED EMBODIMENT

Other objects, features and advantages will occur from the following description of a preferred embodiment and the accompanying drawings, in which:

FIG. 1 is a sectional schematic diagram of a thermally powered isostatic densifying press according to this invention;

FIG. 2 is a press similar to FIG. 1 showing an alternative heat exchanger device;

FIG. 3 is a view of a thermally powered isostatic densifying press which operates upon an increase of temperature;

FIG. 4 is a view similar to FIG. 5 of an alternative heat exchange device;

Figure 8:
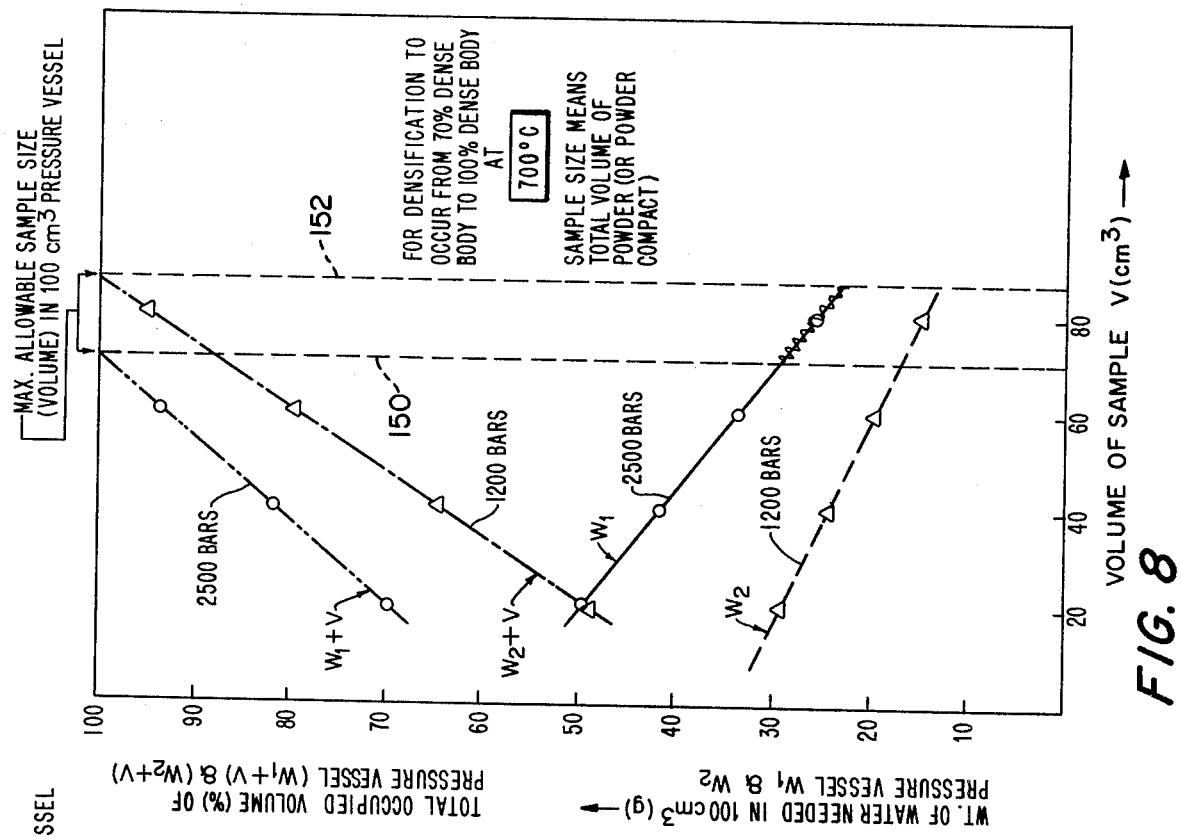
Figure 7:
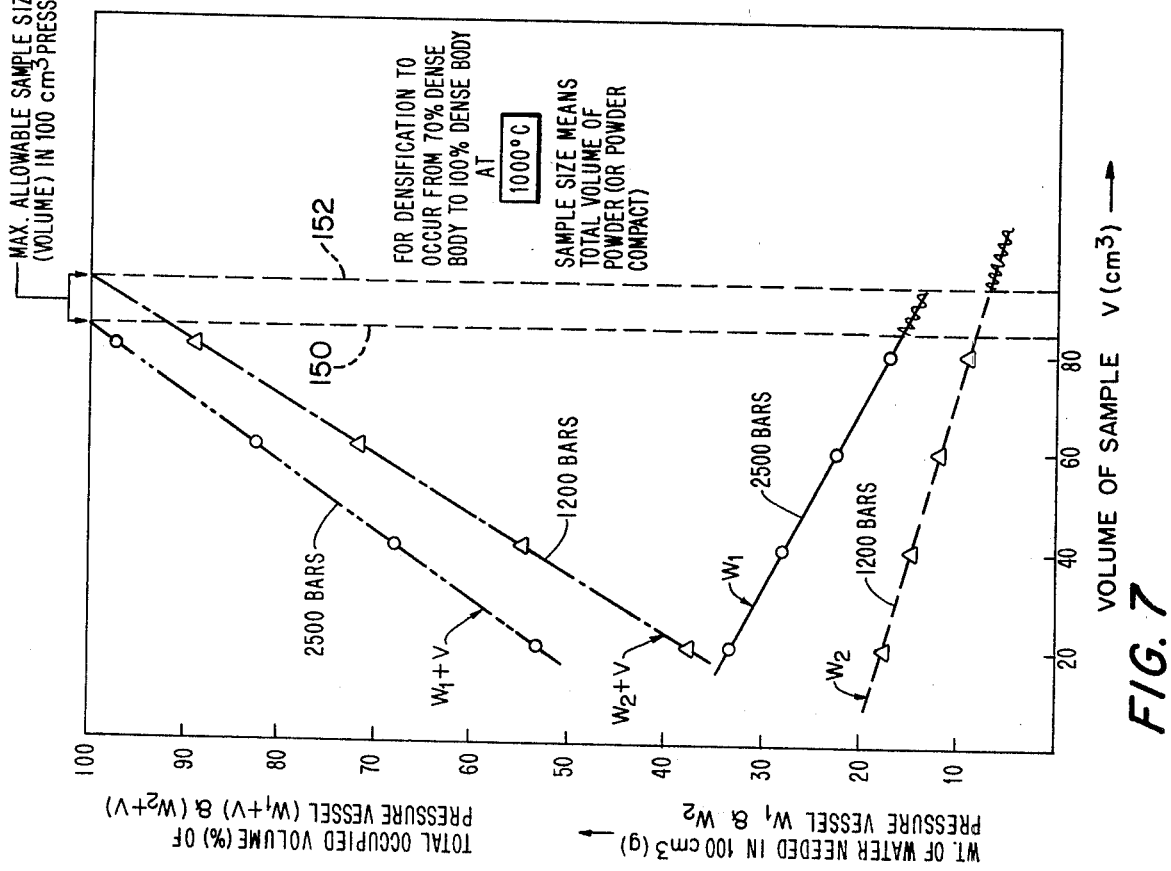
FIG. 7 illustrates plots of water weight versus sample volume at two different pressures and water plus sample volume versus sample volume at two different pressures, all at 1000° C.
Figure 9:
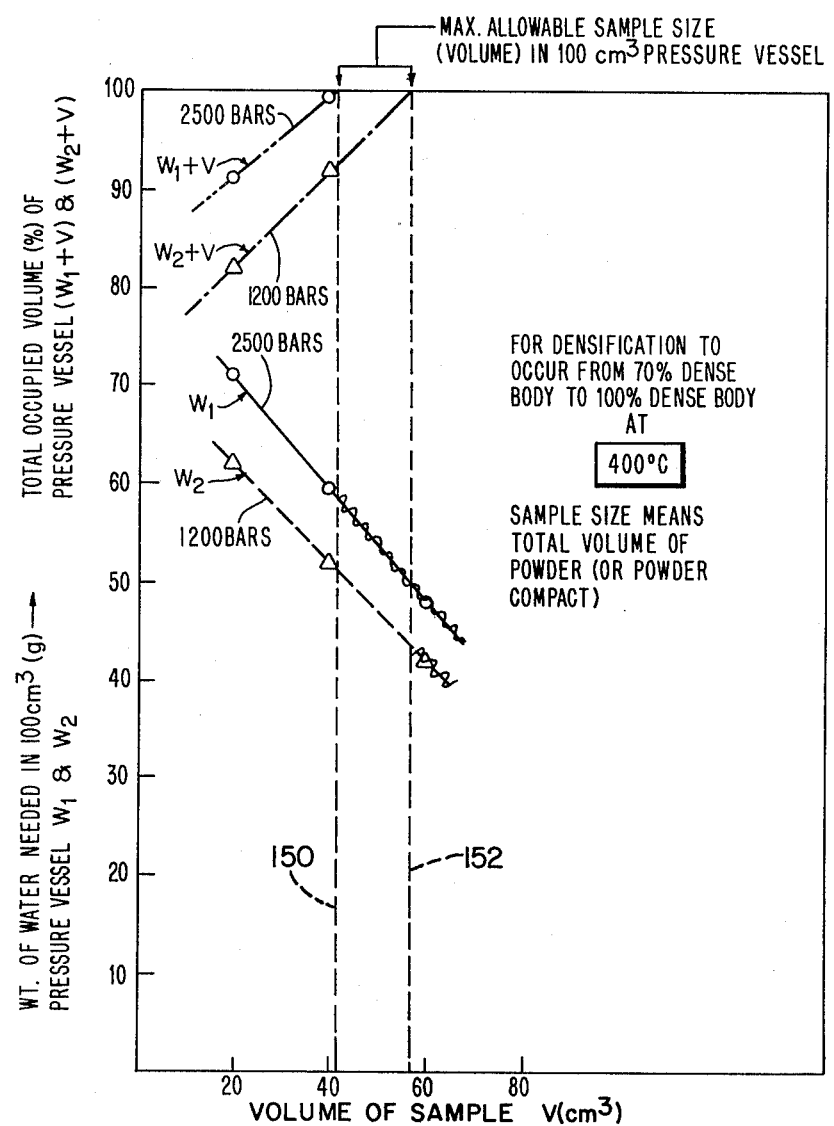

FIG. 8 contains plots similar to FIG. 7 at 700° C.;

FIG. 9 contains plots similar to FIG. 7 at 400° C.; and

Figure 10:
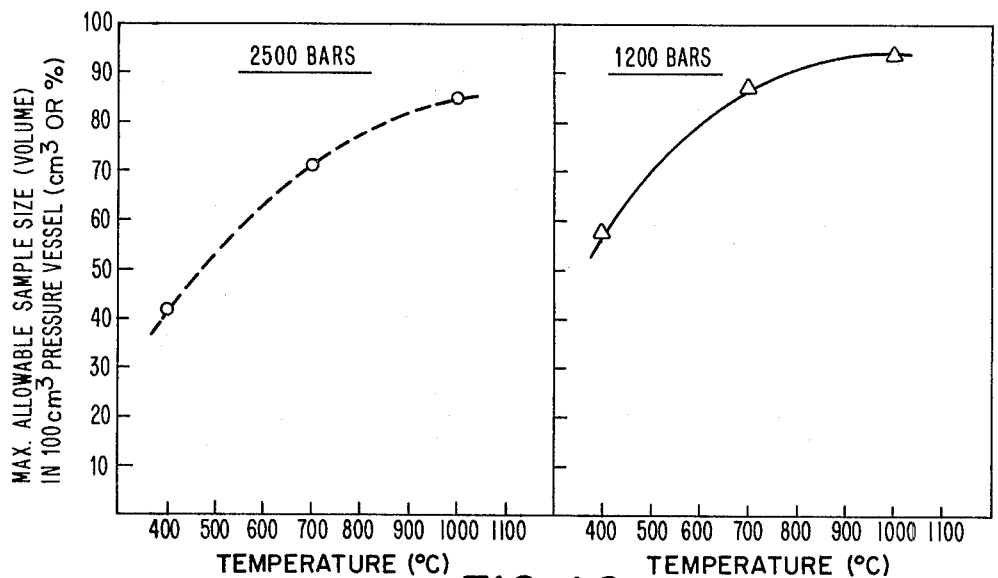

FIG. 10 illustrates the variation of maximum allowable sample size with densification temperature at two different pressures.

The invention may be accomplished in a thermally powered isostatic densifying press. The sample to be compressed may be a metal, ceramic, or plastic powder or powder compact. There is a container for enclosing the sample that is to be densified. The container is typically an elastomeric or rubber material for use at lower temperatures. At higher temperatures a plastically deformable material such as copper, steel, iron, or glass may be used to construct the container. A pressure vessel holds the container and has an opening in it for enabling access to the interior to allow the container to be installed and removed. The opening has a closure member which sealingly engages the opening. The pressure vessel may be cylindrical in form having a sealable threaded lid which is removable and replaceable for access to the interior, or it may be a cube or a generally rectangular prism which has a hatch or an entire side which is removable and replaceable. A thermally expansive pressurizing medium is disposed in the pressure vessel between the vessel and container and completely surrounding the container. The volume of this medium varies as a function of the thermal energy. For example, the medium may be either water or liquid bismuth, both of which increase in volume with a decrease in temperature or removal of thermal energy therefrom as they change from the liquid to the solid state. Alternatively, the pressurizing medium may be any substance which increases in volume with increase in temperature; for example water, alcohol, acetic acid, liquid nitrogen, carbon dioxide, lead, copper. Cryogenic materials, e.g. liquid nitrogen, may also be used. These substances may be placed in the vessel in one state, for example solid (not ice) and then heated beyond the melting point to the liquid state; or the increase in temperature may be wholly within the range of the liquid state of the medium. In the first case, where the expansion is produced upon freezing or solidifying of water or bismuth, the container may be a flexible, elastomeric, or similar substance. In the second case, where the volume increase is produced by increasing temperature, the container may be either elastomeric or, if the temperatures are more elevated, plastically deformable such as glass or metal. In the case where the temperature ranges are quite elevated, the apparatus and method of this invention function similarly to the hot isostatic press (HIP) techniques of the prior art in that the heating and plastic flow of the powder compact resulting in intense densification occurs simultaneously with the pressurizing. If the temperatures are not elevated sufficiently, then the thermal expansion produced by increasing temperature or by decreasing temperature may be operated much as the cold isostatic press (CIP) technique of the prior art.

A heat exchanger device is used to vary the thermal energy of the pressurizing medium to compel it to expand and exert increasing pressure on the surrounding container to compress and densify the sample therein. The heat exchange function may be performed by coils wrapped around the pressure vessel; hot air blown onto the walls of the vessel; liquid nitrogen released around it; heater elements extending into the medium; and various other techniques for increasing or decreasing the thermal energy in the medium. When climatic conditions permit, ambient temperature may be used to add or subtract heat, in which case the pressure vessel walls may function as the heat exchanger.

This invention provides a large amount of shrinkage of the sample; for example, with water as the pressurizing medium there is approximately a ten percent increase in volume of the water as it changes state from liquid to solid with loss of heat. If the volume of water in the vessel is one cubic foot, one can then expect that the volume of ice resulting will be 1.1 cubic feet. Therefore, if the sample is to have its density increased from fifty percent to seventy-five percent the volume of the shrinkage of the sample should be equivalent to a ten percent expansion of the water. Thus the sample would start out with a volume of 0.3 cubic feet and end up with a volume of 0.2 cubic feet.

There is shown in FIG. 1 a thermally powered isostatic press 10 for densifying samples. Press 10 includes a conventional pressure vessel 12 with an opening 14 sealed by a releasably engageable hatch 16 which enables access to the interior for loading container 18, in which is contained the sample 20 to be densified. In this illustration sample 20 is a powdered metal and container 18 is a flexible elastomeric material, e.g. rubber. Vessel 12 is loaded with a pressurizing medium 22 that fills pressure vessel 12 and surrounds container 18. In this example the increase in pressure is to be developed by medium 22 by the withdrawal of thermal energy therefrom; thus medium 22 is preferably water or bismuth, both of which expand upon freezing or solidifying from the liquid state to the solid. With water constituting medium 22 installed in vessel 12 and hatch 16 secured, liquid nitrogen from source 24 is supplied to a conduit 26 to cool medium 22 below the freezing point of the liquid 22. Typically, vessel 12 in FIG. 1 is disposed on supports 28 in a receptacle 30 sealed by means of cover 32 and bolts 34. The liquid nitrogen may be allowed to escape as it boils off. As the water, medium 22, changes to ice, it expands approximately ten percent and exerts an isostatic pressure, that is equal pressure in all directions, on the inner walls of vessel 12 and the outer walls of container 18, as indicated by arrows 37.

After the expansion has taken place and sample 20 has been densified, hot air or steam in the case of water as medium 22, from source 38 may be supplied through conduit 40 to the interior of receptacle 30 to heat at least the portion of the ice, medium 22, that is in contact with the walls of pressure vessel 12, so that the ice can be lifted out through hatch 16 and the ice broken away from container 18. Alternatively the ice, medium 22, could be left there until it melts under the influence of the hot air from source 38 or simply from existing ambient temperatures. If receptacle 30 is closed, hot air or steam may be withdrawn through conduit 42 for re-use.

In a more energy efficient operation, it should be readily understood that vessel 12, having been loaded with container 18 and the water, medium 22, in a room which is above freezing, may be simply placed out-of-doors in sub-freezing weather, where medium 22 will change from water to ice without the need for additional energy inputs. Conversely, if the temperature is above freezing, the ambient condition can be used to increase the thermal energy after freezing has occurred.

The necessary amount of heat may be removed from medium 22 by a heat exchanging device such as coil 44, FIG. 2, wrapped around vessel 12 and fed with liquid nitrogen from source 24 by input conduit 46. In conventional manner, pressure vessel 12 with coils 44 may be installed in an insulated receptacle.

The pressure on a sample, and thus the shrinkage in percent of vessel volume, depends upon the pressurizing expansion medium, the volume of the vessel in which the medium is contained, and the volume of the sample and container. The pressure on the sample and the shrinkage also depend on the change in temperature of the medium. However in the case where the expansion is due to the change of state, the change in temperature is not directly related to the increase in volume; it only triggers the action which increases the volume.

In another realization of the invention, the expansion which produces the increase in pressure is produced by adding heat to the medium. For example, a heating fluid source 80, FIG. 3, provides the heating fluid through conduit 82 to coils 84, and the fluid is returned through conduit 86. Medium 22 may be any material which increases its volume with increase in temperature. Container 18a may be a flexible rubber or plastically deformable metal or glass structure in order to withstand elevated temperatures if such are encountered. Elevated temperatures are encountered if press 10 is desired to induce intense densification from plastic flow of the powder of sample 20 as it is being pressed. The press may be operated either as a cold isostatic process or a hot isostatic process, as desired. For hot isostatic operation it is only necessary to operate in a temperature range in which occurs plastic flow of the particular material utilized in sample 20. It is only necessary then to choose the proper temperature range to obtain the necessary heat to have the press operate as a hot isostatic process.

Alternatively, heat may be supplied to vessel 12 and medium 22 by means of electric heater rods 90, FIG. 4, energized by some electric power source on line 92. Heater rods 90 are sealingly engaged with vessel 12 where they enter, and their upper ends 94 produce the necessary heat to increase the temperature of medium 22 to the necessary level to produce the expansion in medium 22 surrounding container 18a to induce the necessary shrinkage in sample 20. The heater may be placed wholly within the pressure vessel, and other than rod-like shapes may be used: for example, a cylindrical configuration for disposition close to the cover surface of the pressure vessel. Various other means for heating and cooling medium 22 to increase the pressure and to subsequently decrease the pressure may be used and are not a limitation of the invention.

Figure 5:
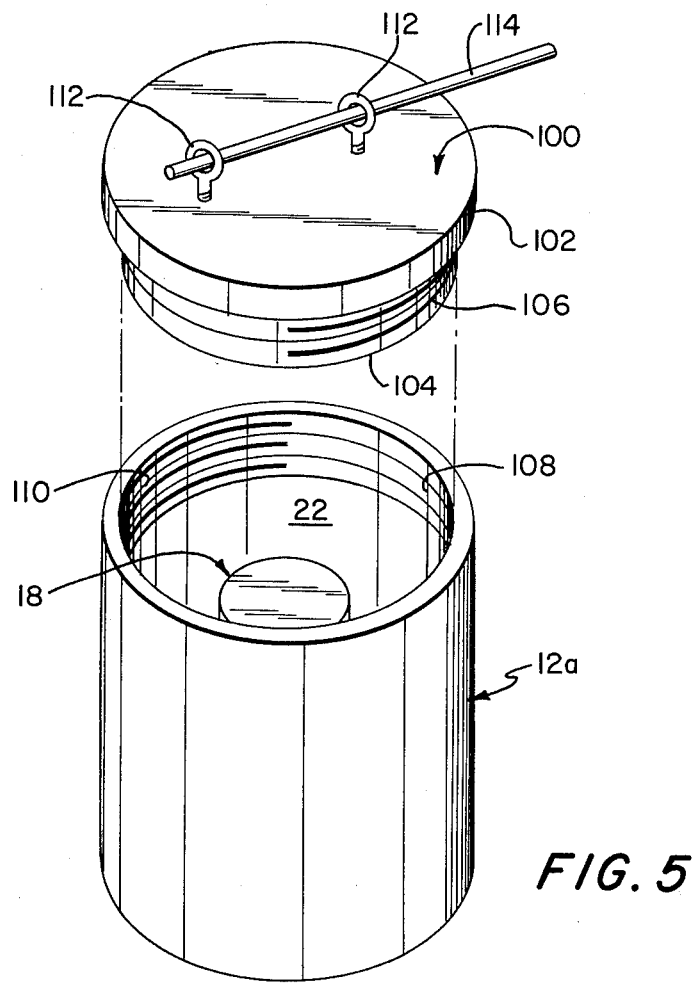
FIG. 5 is an axonometric view of a cylindrical pressure vessel.

A typical cylindrical pressure vessel 12a, FIG. 5, is shown with a cap 100 having a flange 102 and a reduced section 104 with threads 106 that engage similar threads 108 in opening 110. A pair of eye bolts 112 fastened to cap 100 receive a bar 114 which may be used to rotate and to lift cap 100 so that flexible container 18, as well as medium 22, may be installed and removed therefrom.

Figure 6:
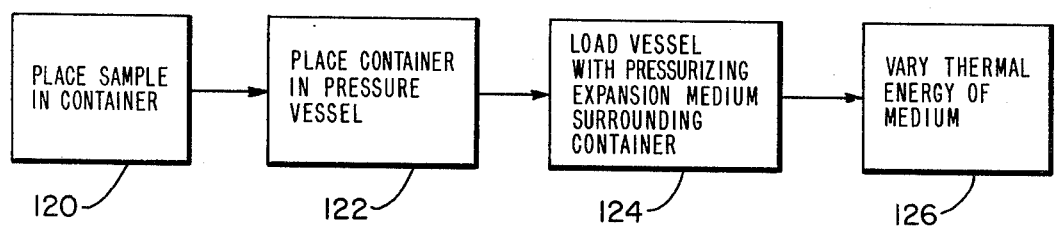
FIG. 6 is a chart showing the method of this invention.

Irrespective of the particular structure or press used to carry out the invention, the method is the same. First, a sample is placed in a container 120, FIG. 6. Following this the container is placed in a pressure vessel 122 and the pressure vessel is loaded, 124, with a pressurizing expansion medium surrounding the container. Finally the thermal energy of the medium is varied, 126: either the thermal energy is decreased to produce the expansion, such as with water or bismuth, or the thermal energy is increased, such as with any material which expands with increase in temperature, to increase the pressure on the container and compress and densify the sample.

Since theoretically the magnitude of the pressure is limited only by the ability to provide a pressure vessel with a sufficient strength, this technique, in addition to providing an extremely simple and inexpensive method of fabricating parts, also opens new possibilities in whole new fields of research in fabrication technology such as lower temperature intense densification of powdered materials.

The manner in which this invention functions and the magnitude of the pressure generated may be better understood through an example using a pressure vessel whose total available volume equals 100 cc, with a sample that is to be densified from an initial 70% dense body to one that is 100% dense. This example is explained in terms of two samples; one under a pressure of 2500 bars, the other at 1200 bars, both at a temperature of 1000° C. At 1000° C. and 2500 bars pressure, the density of water is 0.3862 grams/cc. At 1200 bars of pressure the density of water is 0.2021 grams/cc. The total available volume in the pressure vessel for the expansion medium and the sample excluding that occupied by the container, heaters, etc., is 100 cc. The unknown volume of the sample is designated V. For densification to occur from 70% to 100% the final volume of the sample must be 0.7 V. Since the density of water at 2500 bars is equal to 0.3862 grams/cc, the weight of water that will be required is equal to $(100 - 0.7 V) 0.3862 = W_1$. Similarly, the weight of water required at a pressure of 1200 bars is equal to $(100 - 0.7 V) 0.2021 = W_2$. The results of these calculations for various volumes V of the sample are tabulated below in Table I.

TABLE I

| V(cc) | (100−0.7V) (cc) | 2500 bars | | 1200 bars | |
|---|---|---|---|---|---|
| | | $W_1$(gm) | $(W_1+V)$ (cc) | $W_2$(gm) | $(W_2+V)$ (cc) |
| 20 | 86 | 33.21 | 53.21 | 17.38 | 37.38 |
| 40 | 72 | 27.81 | 67.81 | 14.55 | 54.55 |
| 60 | 58 | 22.40 | 82.40 | 11.72 | 71.72 |
| 80 | 44 | 16.99 | 96.99 | 8.89 | 88.89 |

Because the density of water at room temperature is close to 1 gm/cc, it is permissible for purposes of illustration in Table I to add the volume V directly to the weight $W_1$ and $W_2$ in the fourth and sixth columns of the table. Also, since the basis of the calculation was a 100 cc volume, the values of $(W_1+V)$ and $(W_2+V)$ also represent the percentage volume of the pressure vessel that is occupied by the sample and the water at room temperature for densification to occur at 100%. FIG. 7 illustrates plots of $W_1$ and $W_2$ versus V, and $(W_1+V)$ and $(W_2+V)$ versus V. The $W_1$ and $W_2$ plots show the amount of water that is required at 1000° C. for achieving 100% densification at pressures of 2500 and 1200 bars in samples of different sizes. The $W_1+V$ and $W_2+V$ plots show the maximum size of a 70% dense sample that can be placed in the pressure vessel for 100% final densification. Therefore, it is clear that the position of the $W_1$ and $W_2$ plots extending toward the higher sample sizes beyond the maximum allowable sample size have no relevance for 100% densification, since this would require more water than can be placed in the available volume.

Similar plots are shown for a temperature of 700° C. in FIG. 8 and 400° C. in FIG. 9. The density values of water at high temperatures and high pressures used in these calculations were obtained from the article entitled "Pressure-Volume-Temperature Relations in Water at Elevated Temperatures and Pressures," by G. C. Kennedy, *American Journal of Science,* 248, 1950, page 540. In FIG. 10 the data from FIGS. 7, 8 and 9 has been arranged to show the variation of the maximum allowable sample size with densification temperature at the 2500 and 1200 bar pressures. FIG. 10 indicates that sample sizes greater than the maximum allowable result in densification at pressures much lower than desirable because a lower volume of water must be used. Conversely, if a larger volume of water is used than is needed, for example for a smaller sample, to achieve 100% density, the process occurs at a much higher pressure. If a lower pressure is desired in such circumstances, a pressure relief mechanism would be used.

Other embodiments will occur to those skilled in the art and are within the following claims:

What is claimed is:

1. A thermally powered isostatic densifying press comprising:
    a pressure vessel for holding a sample to be densified and having an opening therein for enabling access to the interior thereof and closure means for sealing said opening;
    a thermally expansive fluid pressurizing medium, disposed in said pressure vessel intermediate said vessel and said sample, whose volume varies as a function of applied thermal energy; and
    a heat exchanger device for varying the thermal energy of said pressurizing medium to compel it to expand and exert increased pressure on the sample to compress and densify the sample.

2. The thermally powered isostatic press of claim 1 further including a container for holding the sample to be densified surrounded by said pressurizing medium in said vessel.

3. The thermally powered isostatic press of claim 2 in which said container is made of a flexible material.

4. The thermally powered isostatic press of claim 2 in which said container is made of a plastically deformable material.

5. The thermally powered isostatic press of claim 1 in which said thermally expansive pressurizing medium increases in volume with an increase in thermal energy.

6. The thermally powered isostatic press of claim 1 in which said thermally expansive pressurizing medium increases in volume as it changes state from liquid to solid with a decrease in thermal energy.

7. The thermally powered isostatic press of claim 1 in which said heat exchanger device includes a receptacle for receiving a heat exchanger fluid in heat transferring contact with said vessel.

8. The thermally powered isostatic press of claim 1 in which said heat exchanger device includes a coil for direction a flow of heat exchanger fluid about said vessel in heat transferring relationship therewith.

9. The thermally powered isostatic press of claim 1 in which said heat exchanger device includes at least one heater element in contact with said medium in said vessel.

10. The thermally powered isostatic press of claim 1 in which said heat exchanger device includes said pressure vessel.

11. A thermally powered isostatic densifying press comprising:
    a container for enclosing a sample to be densified;
    a pressure vessel, for holding said container and having an opening therein for enabling access to the interior thereof and closure means for sealing said opening;
    a thermally expansive fluid pressurizing medium, disposed in said pressure vessel intermediate said vessel and said container whose volume varies as a function of applied thermal energy; and
    a heat exchanger device for varying the thermal energy of said pressurizing medium to compel it to expand and exert increased pressure on said container to compress and densify a sample therein.

12. A method of thermally isostatically densifying a sample comprising: placing the sample to be densified into a container; installing the container with the compact in a pressure vessel and filling the vessel with a thermally expansive fluid pressurizing medium, with the medium intermediate the vessel and container; and varying the thermal energy of said medium to cause it to expand and exert increased pressure on the container and densify the sample therein.

13. A method of thermally isostatically densifying a sample comprising: placing a sample to be densified into a pressure vessel and filling the vessel with a thermally expansive fluid pressurizing medium, with the medium intermediate the vessel and sample; and varying the thermal energy of said medium to cause it to expand and densify the sample.

* * * * *